(12) United States Patent
Welchko et al.

(10) Patent No.: US 8,446,113 B2
(45) Date of Patent: May 21, 2013

(54) VEHICULAR ELECTRICAL SYSTEM AND METHOD FOR CONTROLLING AN INVERTER DURING MOTOR DECELERATION

(75) Inventors: Brian A Welchko, Torrance, CA (US); Konstantin S. Majarov, Torrance, CA (US); Silva Hiti, Redondo Beach, CA (US); Steven E. Schulz, Torrance, CA (US); Aniket Kothari, Southfield, MI (US); Nicholas Kokotovich, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 12/817,950

(22) Filed: Jun. 17, 2010

(65) Prior Publication Data
US 2011/0309777 A1    Dec. 22, 2011

(51) Int. Cl.
*H02P 3/14* (2006.01)

(52) U.S. Cl.
USPC .............. 318/376; 318/400.09; 318/400.11

(58) Field of Classification Search
USPC .............. 318/376, 400.09, 400.11, 400.27, 318/148, 151, 771; 363/131
See application file for complete search history.

(56) References Cited

U.S. PATENT DOCUMENTS

| | | | |
|---|---|---|---|
| 3,774,095 A | 11/1973 | Coccia | |
| 4,761,600 A | 8/1988 | D'Atre et al. | |
| 5,670,856 A | 9/1997 | Le et al. | |
| 5,687,049 A | 11/1997 | Mangtani | |
| 5,757,599 A | 5/1998 | Crane | |
| 5,963,706 A | 10/1999 | Baik | |
| 6,118,238 A | 9/2000 | Munro et al. | |
| 6,239,996 B1 | 5/2001 | Perreault et al. | |
| 6,392,418 B1 | 5/2002 | Mir et al. | |
| 6,476,996 B1 | 11/2002 | Ryan | |
| 6,694,287 B2 | 2/2004 | Mir et al. | |
| 6,741,060 B2 | 5/2004 | Krefta et al. | |
| 7,274,243 B2 | 9/2007 | Pace et al. | |
| 7,279,862 B1 | 10/2007 | Welchko et al. | |
| 7,339,803 B2 | 3/2008 | Nojima | |
| 7,652,858 B2 | 1/2010 | Tang et al. | |
| 2002/0145837 A1 | 10/2002 | Krefta et al. | |
| 2002/0176266 A1 | 11/2002 | Perreault et al. | |

(Continued)

OTHER PUBLICATIONS

Notice of Allowance, dated Jul. 24, 2012, issued in U.S. Appl. No. 12/817,952.

(Continued)

*Primary Examiner* — Karen Masih
(74) *Attorney, Agent, or Firm* — Ingrassia Fisher & Lorenz, P.C.

(57) ABSTRACT

Methods and systems for operating an inverter having a plurality of high switches and a plurality of low switches coupled to an electric motor are provided. An event indicative of deceleration of the electric motor is detected. The inverter is alternated between a first mode of operation and a second mode of operation during the deceleration of the electric motor. In the first mode of operation, each of the plurality of high switches is activated and each of the plurality of low switches is deactivated or each of the plurality of low switches is activated and each of the plurality of high switches is deactivated. In the second mode of operation, each of the plurality of high switches is deactivated and each of the plurality of low switches is deactivated.

20 Claims, 3 Drawing Sheets

U.S. PATENT DOCUMENTS

| | | |
|---|---|---|
| 2003/0046028 A1 | 3/2003 | Mir et al. |
| 2004/0024937 A1 | 2/2004 | Duncan et al. |
| 2004/0085787 A1 | 5/2004 | Perreault et al. |
| 2005/0253165 A1 | 11/2005 | Pace et al. |
| 2006/0044025 A1 | 3/2006 | Grbovic |
| 2006/0061923 A1 | 3/2006 | Wang et al. |
| 2006/0245222 A1 | 11/2006 | Nojima |
| 2008/0129238 A1 | 6/2008 | Andersen |
| 2010/0309702 A1* | 12/2010 | Yuan et al. .................... 363/131 |

OTHER PUBLICATIONS

Office Action dated Apr. 21, 2009, issued in U.S. Appl. No. 11/758,974.

Response to Office Action dated Jul. 16, 2009, filed in U.S. Appl. No. 11/758,974.

Notice of Allowance dated Sep. 25, 2009, issued in U.S. Appl. No. 11/758,974.

Office Action dated Aug. 11, 2009, issued in U.S. Appl. No. 11/962,370.

Response to Office Action dated Jan. 13, 2010, filed in U.S. Appl. No. 11/962,370.

Notice of Allowance dated May 5, 2010, issued in U.S. Appl. No. 11/962,370.

Corrected Notice of Allowance dated May 14, 2010, issued in U.S. Appl. No. 11/962,370.

\* cited by examiner

VEHICULAR ELECTRICAL SYSTEM AND METHOD FOR CONTROLLING AN INVERTER DURING MOTOR DECELERATION

TECHNICAL FIELD

The present invention generally relates to vehicular electrical systems. More specifically, the present invention relates to vehicular electrical systems and methods for controlling an inverter during deceleration of a permanent magnet motor connected to the inverter.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries perhaps in combination with another actuator to drive the wheels.

During motor deceleration, such as after a collision or an electrical fault, it is desirable to slow the motor (e.g., by applying a braking torque) as rapidly as possible. The amount of braking torque that can be applied to the motor is in part dictated by the voltage across the electrodes of the voltage supply (i.e., the DC link voltage). Generally, there is a tendency for this voltage to increase during deceleration of the motor, particularly when a braking torque is being applied. If the DC link voltage gets too high, some of the electrical components (e.g., the inverter switches) may be damaged. Additionally, for safety reasons, it is desirable to reduce the DC link voltage relatively quickly. However, if the DC link voltage drops too rapidly, the system may lose control of the inverter switches, which are often powered by the DC link.

Accordingly, it is desirable to provide a vehicular electrical system and method that allow for improved management of the DC link voltage during deceleration of the motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for operating an inverter having a plurality of high switches and a plurality of low switches coupled to an electric motor is provided. An event indicative of deceleration of the electric motor is detected. The inverter is alternated between a first mode of operation and a second mode of operation during the deceleration of the electric motor. In the first mode of operation, each of the plurality of high switches is activated and each of the plurality of low switches is deactivated or each of the plurality of low switches is activated and each of the plurality of high switches is deactivated. In the second mode of operation, each of the plurality of high switches is deactivated and each of the plurality of low switches is deactivated.

In another embodiment, a method for operating an inverter having a plurality of pairs of switches, each of the plurality of pairs of switches comprising a high switch and a low switch, coupled to an automotive traction motor is provided. An event indicative of deceleration of the automotive traction motor is detected. The inverter is alternated between a first mode of operation and a second mode of operation during the deceleration of the automotive traction motor if a back electromotive force (EMF) generated by the automotive traction is above a predetermined threshold. In the first mode of operation, each of the plurality of high switches is activated and each of the plurality of low switches is deactivated or each of the plurality of low switches is activated and each of the plurality of high switches is deactivated. In the second mode of operation, each of the plurality of high switches is deactivated and each of the plurality of low switches is deactivated. Each of the plurality of high switches and each of the plurality of low switches is deactivated if the back EMF generated by the automotive traction motor is below the predetermined threshold.

In a further embodiment, an automotive propulsion system is provided. The automotive propulsion system includes an electric motor comprising a plurality of windings, a direct current-to-alternating current (DC/AC) power inverter including a plurality of pairs of power switching devices coupled to the plurality of windings, each pair of power switching devices comprising a high power switching device and a low power switching device, and a processing system in operable communication with the electric motor and the DC/AC power inverter. The processor is configured to detect an event indicative of deceleration of the electric motor and alternate the inverter between a first mode of operation and a second mode of operation during the deceleration of the electric motor. In the first mode of operation, each of the plurality of high switches is activated and each of the plurality of low switches is deactivated or each of the plurality of low switches is activated and each of the plurality of high switches is deactivated. In the second mode of operation, each of the plurality of high switches is deactivated and each of the plurality of low switches is deactivated.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-4 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 4 illustrate systems for operating an inverter coupled to a permanent magnet electric motor. The inverter has a plurality of high switches and a plurality of low switches coupled to the electric motor. An event indicative of deceleration of the electric motor is detected. The inverter is alternated between a first mode of operation and a second mode of operation during the deceleration of the electric motor. In the first mode of operation, each of the plurality of high switches is activated and each of the plurality of low switches is deactivated or each of the plurality of low switches is activated and each of the plurality of high switches is deactivated. In the second mode of operation, each of the plurality of high switches is deactivated and each of the plurality of low switches is deactivated.

Figure 1:
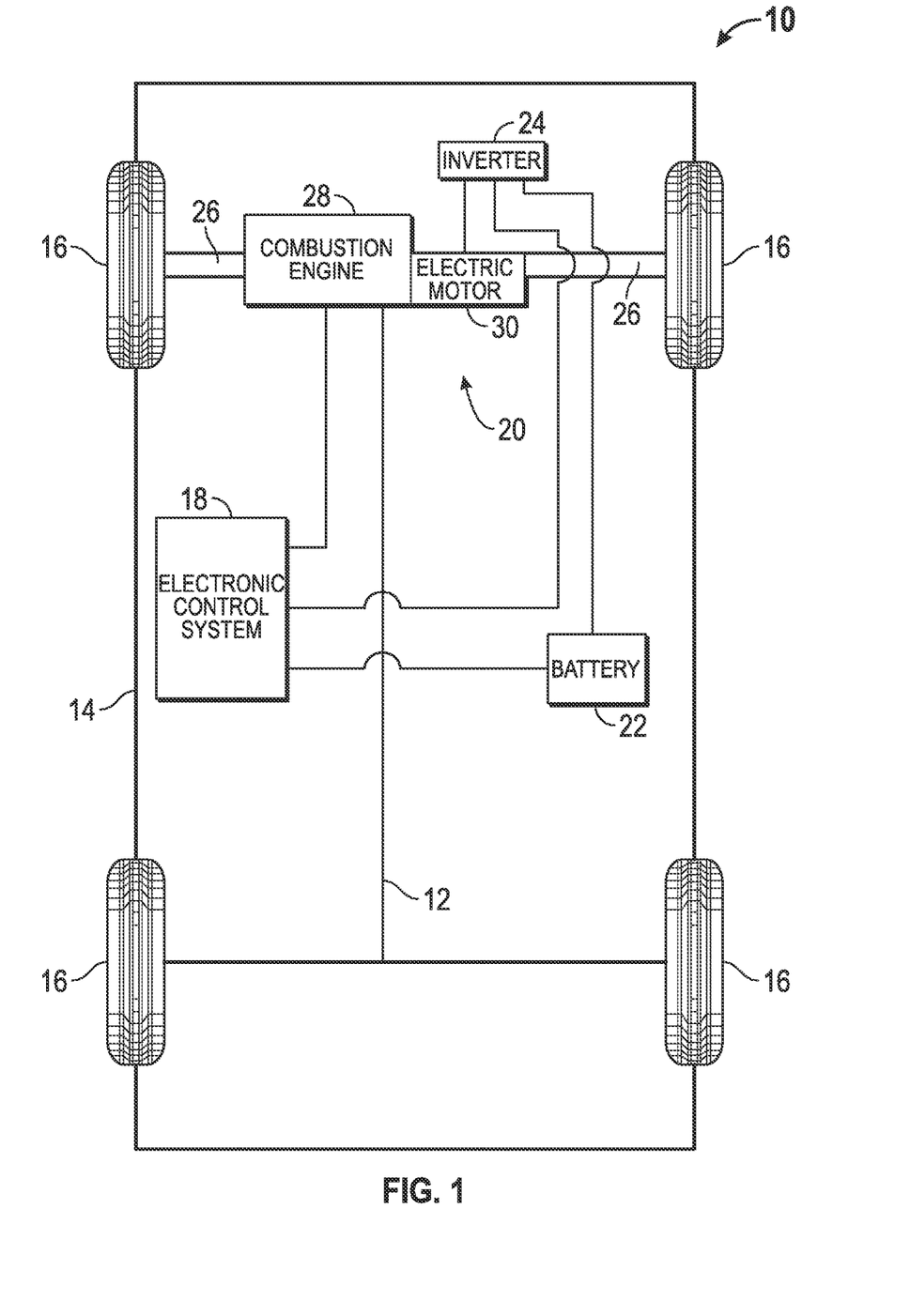
FIG. 1 is a schematic view of an exemplary automobile according to an embodiment.

FIG. 1 is a schematic view of a vehicle (or "automobile" or automotive propulsion system) 10, according to an embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

The automobile 10 in FIG. 1 is an HEV, and further includes an actuator assembly 20, a battery (e.g., a high voltage battery) 22, and a power electronics assembly (e.g., an inverter or inverter assembly) 24. The actuator assembly 20 is mechanically coupled to at least some of the wheels 16 through drive shafts 26 and includes a combustion engine 28 and an electric motor/generator (or traction motor) 30. The combustion engine 28 and/or the electric motor 30 are integrated such that one or both are mechanically coupled to the drive shafts 26 through a transmission (not shown). The battery 22 may be, for example, a lithium ion battery and include an integrated voltmeter.

In an embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The electronic control system 18 is in operable communication with the actuator assembly 20, the battery 22, and the inverter 24. Although not shown in detail, the electronic control system 18 includes various sensors and automotive control modules, or electronic control units (ECUs), such as an inverter control module, a motor controller, and a vehicle controller, and at least one processor (or processing system) and/or a memory having instructions stored thereon (or in another computer-readable medium) for carrying out the processes and methods as described below.

Figure 2:
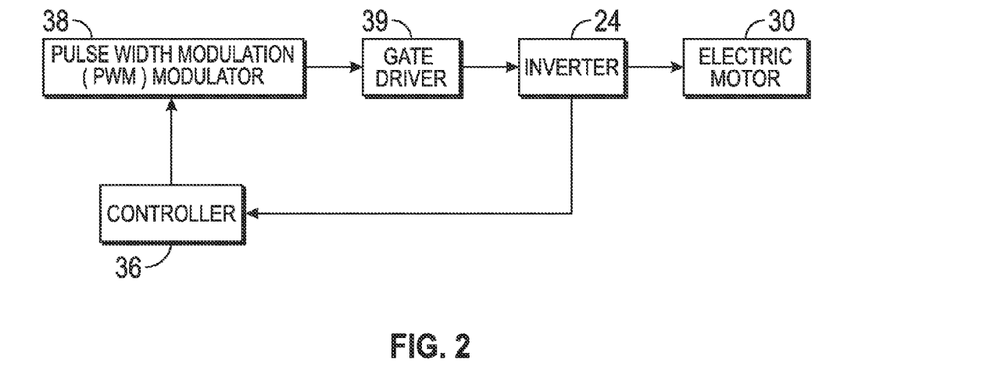
FIG. 2 is a block diagram of an inverter control system within the automobile of FIG. 1, according to an embodiment.

Referring to FIG. 2, an inverter control system 34, in accordance with an exemplary embodiment of the present invention, is shown. The inverter control system 34 includes a controller (or processor) 36 in operable communication with a Pulse Width Modulation (PWM) modulator 38 (or a pulse width modulator) and the inverter 24 (at an output thereof). The PWM modulator 38 is coupled to a gate driver 39, which in turn has an output coupled to an input of the inverter 24. The inverter 24 has a second output coupled to the motor 30. The controller 36 and the PWM modulator 38 may be integral with the electronic control system 18 shown in FIG. 1.

Figure 3:
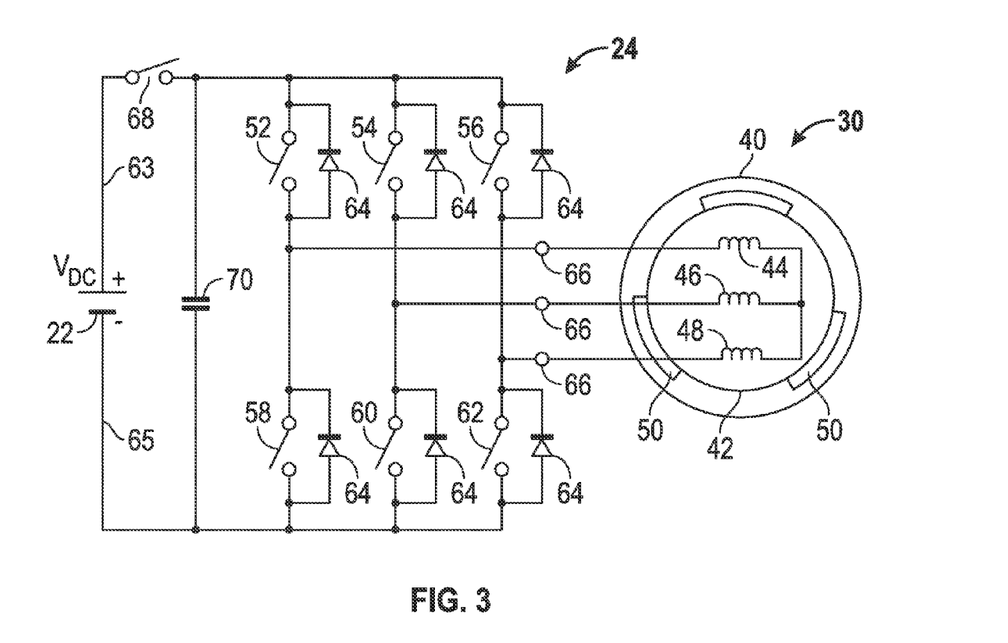
FIG. 3 is a schematic of a power inverter, a voltage supply, and an electric motor within the automobile of FIG. 1, according to an embodiment.

FIG. 3 schematically illustrates the battery (and/or DC voltage source) 22, the inverter 24, and the motor 30 of FIGS. 1 and 2 in greater detail. In the depicted embodiment, the inverter 24 includes a three-phase circuit coupled to the motor 30. More specifically, the inverter 24 includes a switch network having a first input coupled to the battery 22 (i.e., a voltage source or supply (VDC)) and an output coupled to the motor 30. Although a single voltage source is shown, a distributed DC link with two or more series sources may be used.

As will be appreciated by one skilled in the art, the electric motor 30, in one embodiment, is a permanent magnet electric motor and includes a stator assembly 40 and a rotor assembly 42. The stator assembly 40 includes a plurality (e.g., three) conductive coils or windings 44, 46, and 48, each of which is associated with one of the three phases of the electric motor 30, as is commonly understood. The rotor assembly 42 includes a plurality of magnets 50 and is rotatably coupled to the stator assembly 40, as is commonly understood. The magnets 50 may include multiple (e.g., sixteen) electromagnetic poles, as is commonly understood. It should be understood that the description provided above is intended only as an example of one type of electric motor that may be used.

The switch network comprises three pairs of series power switching devices (or switches or components) with antiparallel diodes (i.e., antiparallel to each switch) corresponding to each of the phases of the motor 30. Each of the pairs of series switches comprises a first switch, or transistor, (i.e., a "high" switch) 52, 54, and 56 having a first terminal coupled to a positive electrode 63 of the voltage source 22 and a second switch (i.e., a "low" switch) 58, 60, and 62 having a second terminal coupled to a negative electrode 65 of the voltage source 22 and a first terminal coupled to a second terminal of the respective first switch 52, 54, and 56. Thus, the first terminal of the high switches 52, 54, and 56 and the second terminals of the low switches 58, 60, and 62 are connected across the DC link of the voltage source 22 (i.e., across the positive and negative electrodes 63 and 65 of the voltage source 22).

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, a diode 64 is connected in an antiparallel configuration (i.e., a "flyback" or "freewheeling" diode) to each of the switches 52-62. As such, each of the switches 52-62 and the respective diode 64 may be understood to form a switch-diode pair or set, six of which are included in the embodiment shown. The inverter 24 also includes current sensors (e.g., Hall Effect sensors) 66 to detect the flow of current through the switches 52-62 and/or the windings 44, 46, and 48.

Still referring to FIG. 3, the inverter 24 further includes a voltage disconnect switch (or battery contactor) 68 and a DC link capacitor 70. The battery contactor 68 may be similar to switches 52-62 and connected to the positive terminal of the voltage source (i.e., the battery) 22. In other embodiments, the contactor may be mechanically based, such as a relay. The DC link capacitor 70 is connected across the DC link of the system (i.e., across the positive and negative terminals of the voltage source 22).

Referring to FIG. 1, during normal operation (i.e., driving), the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the switches 52-62 within the inverter 24 at an operating (or switching) frequency, such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the motor 30. The inverter control system 34 of FIG. 2 consists of multiple operations during normal operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 39 generate the necessary gate pulses (or duty cycles) which are sent to the inverter 24 to control the electric motor 30 to the desired speed and/or torque.

As will be appreciated by one skilled in the art, the operation of the switches 52-62 (FIG. 3) causes current to flow through the windings 44, 46, and 48 in the motor 30. The interaction of this current with the magnetic fields generated by the magnets 50 causes a Lorentz force to be generated, thus causing the rotor 42 to rotate relative to the stator 40.

According to one aspect of the invention, upon detecting an event indicative of an "unexpected" deceleration (e.g., not normal braking) of the motor 30 (and/or the automobile 10 as a whole), the inverter 24 alternates between a "short" mode of operation and an "open" mode of operation. In the short mode, all of the high switches 52, 54, and 56 are activated, while the low switches 58, 60, and 62 are deactivated, or all of the low switches 58, 60, and 62 are activated, while all of the high switches 52, 54, and 56 are deactivated. In the open mode, all of the switches (both high and low) 52-62 are deactivated. This switching operation may allow the voltage across the DC link to decrease in a relatively controlled manner while the motor 30 continues to spin freely (i.e., the rotor 42 continues to rotate relative to the stator 40).

Figure 4:
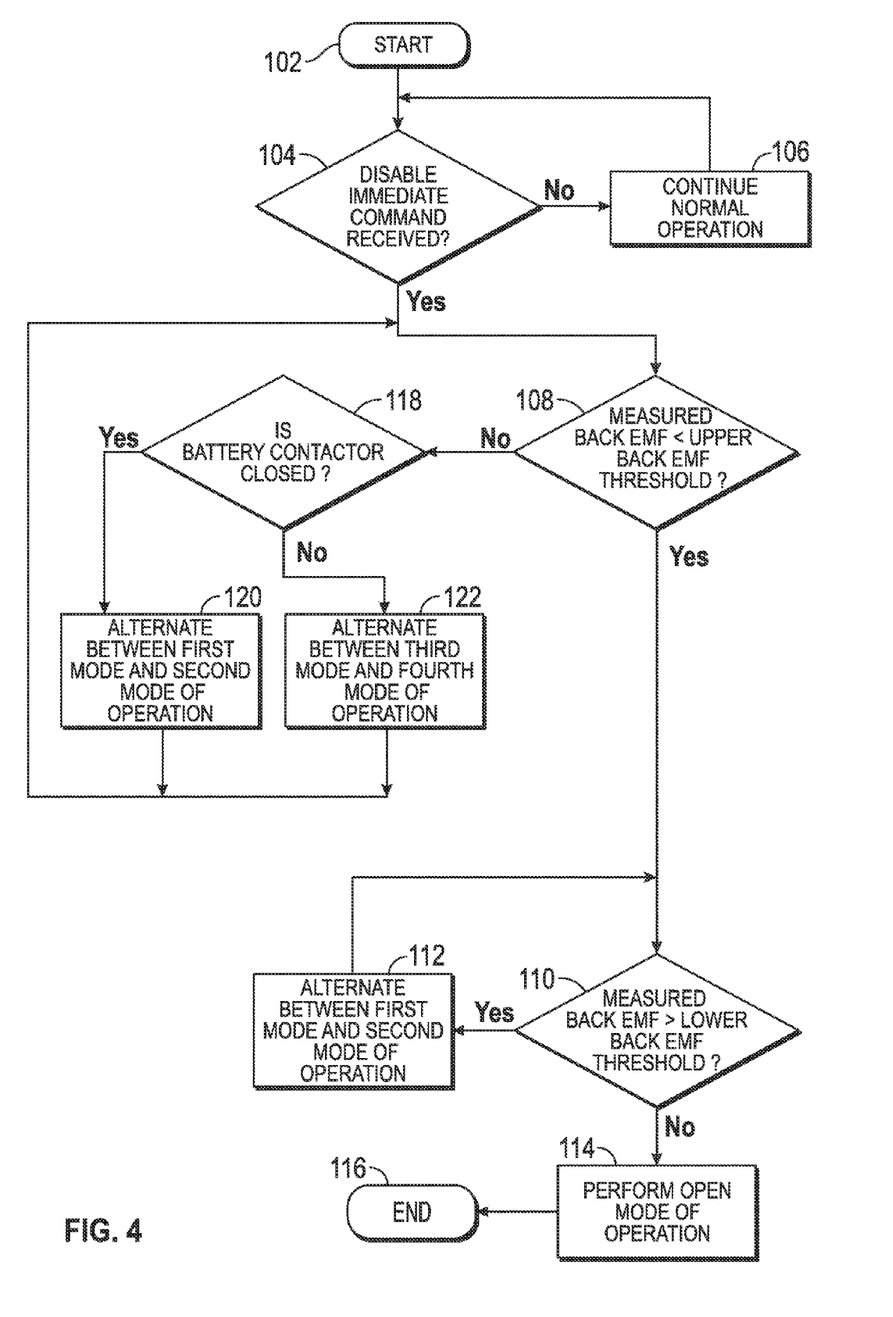
FIG. 4 is a flow chart of a method for operating an inverter, according to an embodiment.

FIG. 4 illustrates a method (and/or system) 100 for controlling the inverter 24, according to one embodiment. The method 100 begins at step 102 with the inverter 24 (and the electric motor 30) in normal operation. At step 104, if a "disable immediate" command (e.g., referring to disconnecting the battery and ceasing motor operation) has not been received, normal operation continues at step 106. However, reception of such a command indicates that the vehicle 10 has detected an event that indicates a deceleration of the electric motor 30 during otherwise normal operation, and that cessation of the operation of the motor 30 (and/or disconnection of the battery 22) is imminent. The disable immediate command may be initiated by, for example, the vehicle 10 being involved in a collision (e.g., detected by the vehicle controller) or an electrical fault (e.g., a winding short or an overvoltage situation). The battery 22 may be disconnected from the motor 30 such that the motor 30 (i.e., the rotor 42) is "free spinning" (and slowly decelerating) and/or a braking torque is applied by the inverter 24 in order to slow the rotor 42.

At step 108, the counter-electromotive force (EMF), also known as the back EMF, generated by the spinning electric motor is compared to an upper predetermined threshold. The upper back EMF threshold may be, for example, between 400 and 450 volts. If the measured back EMF is less than (or not greater than) the upper threshold, the method 100 continues to step 110.

At step 110, the measured back EMF is compared to a lower predetermined threshold. The lower back EMF threshold may be, for example, between 50 and 60 volts. If the measured back EMF is greater than the lower threshold, the method continues to step 112. At step 112, the inverter control module repeatedly alternates the inverter 24 between first and second modes of operation.

The first mode of operation is a "short" mode of operation in which all of the high switches 52, 54, and 56 are activated (or closed or turned ON) while all of the low switches 58, 60, and 62 are deactivated (or open of turned OFF), or all of the low switches 58, 60, and 62 are activated while all of the high switches 52, 54, and 56 are deactivated. The second mode of operation is an "open" mode of operation in which all of the switches 52-62, both high and low, are deactivated.

In one embodiment, this alternating between the first and second modes of operation is performed such that the inverter 24 is in the first mode of operation approximately 90% of the time and in the second mode of operation approximately 10% of the time. As an example, the high switches 52, 54, and 56 may be synchronized with a 90% duty cycle and the lower switches 58, 60, and 62 may be operated at 0% duty cycle. The resulting inverter 24 operation will be a short mode 90% of the time and an open mode the remaining 10% of the time.

The inverter 24 operation enabled at step 112 causes the back EMF, as well as the DC link voltage, to be gradually decreased while still providing sufficient voltage to operate the switches 52-62.

When the back EMF drops below the lower threshold (at step 110), the method 100 proceeds to step 114. At step 114, an open mode of operation, similar to that described above, is performed by the inverter 24. Once the back EMF has dropped below the lower threshold, the open mode of operation maintains the DC link voltage such that the switches 52-62, as well as other components, may still be operated. The method 100 ends at step 116 with, for example, the rotation of the electric motor 30 stopping due to friction and/or an applied braking torque.

Returning to step 108, after receiving the disable immediate command, if the measured or estimated back EMF is above the upper threshold, the method 100 proceeds to step 118. At step 118, it is determined if the battery contactor 68 is closed, or turned ON (i.e., is the battery 22 still connected to the switches 52-62). More specifically, in one embodiment, it is determined if a signal is being received that indicates that the battery contactor 68 is closed. In other embodiments, a voltage measurement may be used.

If the battery contactor 68 is closed, the method 100 proceeds to step 120. At step 120, the inverter 24 is alternated between the first and second modes of operation, similar to those described above with respect to step 112. However, at step 120, in order to reduce the DC link voltage at an increased rate, the inverter 24 may be operated in the second, open mode an increased portion of the time, such as 20% (thus being in the first mode 80% of the time). As shown in FIG. 4, from step 120, the method 100 returns to step 108.

If the battery contactor 68 is not closed at step 118, the method proceeds to step 122. At step 122, the inverter control module repeatedly alternates the inverter 24 between a third and a fourth mode of operation. The mode switching may effectively involve applying approximately a 50% duty cycle to each of the switches 52-62 in a synchronized manner such that the inverter 24 alternates between applying a "high short" and a "low short" to the motor 30. Specifically, in the third mode of operation, all of the high switches 52-56 are activated while all of the low switches are 58-62 are deactivated. In the fourth mode of operation, all of the low switches 58-62 are activated, and all of the high switches 52-56 are deactivated. As shown in FIG. 4, from step 120, the method 100 returns to step 108.

In one embodiment, this switching is performed at the switching frequency (e.g., 12 kHz) such that the time the inverter 24 is in the third mode is approximately equal to the time in the fourth mode (i.e., 50% duty cycle). This switching operation may reduce, or regulate, the voltage across the DC link, which otherwise may become undesirably high while the motor 30 continues to decelerate. The reduction, or management, of the DC link voltage may be caused in part by the "switching losses" inherent with the operation of the switches 52-62, as will be appreciated by one skilled in the art.

A dead-time compensation algorithm may be applied to the switching operation in order to further increase the rate of reduction of, or otherwise adjust, the DC link voltage. As is commonly understood, dead-time compensation algorithms are often used during normal, active operation of automotive traction motors to compensate for the relative delays in current flow caused by the time required for the switches (e.g., switches 52-62) to transfer between states of operation. In one embodiment, the dead-time compensation algorithm may adjust the switching operation during deceleration such that the duty cycles of both the high switches 52-56 and the low switches 58-62 vary, for example, between 47% and 53% (still maintaining approximately a 50/50 split between the first and second modes of operation). The method may end when, for example, the DC link voltage is reduced below a predetermined threshold, such as 70 volts, or the motor stops spinning.

One advantage of the system and method described above is that the DC link voltage may be regulated during deceleration of the motor. As a result, a braking torque may still be applied to the motor, while still reducing the DC link voltage at a desirable level. Additionally, the DC link voltage is prevented from dropping too quickly such that the inverter switches may be controlled while the motor is still free-spinning.

Other embodiments may utilize source devices other than DC/AC inverters, such as DC/DC power converters, and load devices other than electric motors, such as batteries (e.g., lithium ion batteries). The system described above may be implemented in systems other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an inverter having a plurality of high switches and a plurality of low switches coupled to an electric motor, the method comprising:
   detecting an event indicative of deceleration of the electric motor; and
   alternating the inverter between a first mode of operation and a second mode of operation during the deceleration of the electric motor,
   wherein in the first mode of operation, each of the plurality of high switches is activated and each of the plurality of low switches is deactivated or each of the plurality of low switches is activated and each of the plurality of high switches is deactivated, and in the second mode of operation, each of the plurality of high switches is deactivated and each of the plurality of low switches is deactivated.

2. The method of claim 1, wherein the alternating the inverter between the first mode of operation and the second mode of operation occurs only if a back electromotive force, EMF, generated by the electric motor during the deceleration of the electric motor is above a predetermined threshold.

3. The method of claim 2, further comprising deactivating each of the plurality of high switches and each of the plurality of low switches if the back EMF generated by the electric motor during the deceleration of the electric motor is below the predetermined threshold.

4. The method of claim 3, wherein the predetermined threshold is a lower back EMF threshold.

5. The method of claim 4, further comprising receiving a signal indicative of whether or not the plurality of high switches and the plurality of low switches are electrically connected to a battery.

6. The method of claim 5, further comprising alternating the inverter between a third mode of operation and a fourth mode of operation
   if the back EMF generated by the electric motor during the deceleration the electric motor is above a higher back EMF threshold and the received signal indicates that the plurality of high switches and the plurality of low switches are not electrically connected to the battery, wherein the higher back EMF threshold is greater than the lower back EMF threshold, and in the third mode of operation, each of the plurality of high switches is activated and each of the plurality of low switches is deactivated, and in the fourth mode of operation, each of the plurality of low switches is activated and each of the plurality of high switches is deactivated.

7. The method of claim 6, further comprising alternating the inverter between the first mode of operation and the second mode of operation
if the back EMF generated by the electric motor during the deceleration the electric motor is above the higher back EMF threshold and the received signal indicates that the plurality of high switches and the plurality of low switches are electrically connected to the battery.

8. The method of claim 6, wherein the plurality of high switches and the plurality of low switches jointly comprise a plurality of pairs of switches, each pair of switches comprising one of the plurality of high switches and one of the plurality of low switches.

9. The method of claim 6, wherein each of the plurality of high switches and each of the plurality of low switches comprises a first terminal and a second terminal, and within each of the plurality of pairs of switches, the second terminal of the respective high switch is connected to the first terminal of the respective low switch.

10. The method of claim 6, wherein the inverter and the electric motor are configured such that the alternating of the inverter between the first and second modes of operation causes a decrease of a voltage across the first terminals of the plurality of high switches and the second terminals of the plurality of low switches.

11. A method for operating an inverter having a plurality of pairs of switches, each of the plurality of pairs of switches comprising a high switch and a low switch, coupled to an automotive traction motor, the method comprising:
detecting an event indicative of deceleration of the automotive traction motor;
alternating the inverter between a first mode of operation and a second mode of operation during the deceleration of the automotive traction motor if a back electromotive force, EMF, generated by the automotive traction motor is above a predetermined threshold, wherein in the first mode of operation, each of the plurality of high switches is activated and each of the plurality of low switches is deactivated or each of the plurality of low switches is activated and each of the plurality of high switches is deactivated, and in the second mode of operation, each of the plurality of high switches is deactivated and each of the plurality of low switches is deactivated; and
deactivating each of the plurality of high switches and each of the plurality of low switches if the back EMF generated by the automotive traction motor is below the predetermined threshold.

12. The method of claim 11, wherein the predetermined threshold is a lower back EMF threshold and further comprising receiving a signal indicative of whether or not the plurality of high switches and the plurality of low switches are electrically connected to a battery.

13. The method of claim 12, further comprising alternating the inverter between a third mode of operation and a fourth mode of operation if the back EMF generated by the automotive traction motor is above a higher back EMF threshold and the received signal indicates that the plurality of high switches and the plurality of low switches are not electrically connected to the battery, wherein the higher back EMF threshold is greater than the lower back EMF threshold, and in the third mode of operation, each of the plurality of high switches is activated and each of the plurality of low switches is deactivated, and in the fourth mode of operation, each of the plurality of low switches is activated and each of the plurality of high switches is deactivated.

14. The method of claim 13, further comprising alternating the inverter between the first mode of operation and the second mode of operation if the back EMF generated by the automotive traction motor is above the higher back EMF threshold and the received signal indicates that the plurality of high switches and the plurality of low switches are electrically connected to the battery.

15. The method of claim 14, wherein each of the plurality of high switches and each of the plurality of low switches comprises a first terminal and a second terminal, and within each of the plurality of pairs of switches, the second terminal of the respective high switch is connected to the first terminal of the respective low switch, and wherein the inverter and the automotive traction motor are configured such that the alternating of the inverter between the first and second modes of operation causes a decrease of a voltage across the first terminals of the plurality of high switches and the second terminals of the plurality of low switches.

16. An automotive propulsion system comprising:
an electric motor comprising a plurality of windings;
a direct current-to-alternating current, DC/AC, power inverter comprising a plurality of pairs of power switching devices coupled to the plurality of windings, each pair of power switching devices comprising a high power switching device and a low power switching device;
a processing system in operable communication with the electric motor and the DC/AC power inverter, the processing system being configured to
detect an event indicative of deceleration of the electric motor; and
alternate the inverter between a first mode of operation and a second mode of operation during the deceleration of the electric motor,
wherein in the first mode of operation, each of the plurality of high switches is activated and each of the plurality of low switches is deactivated or each of the plurality of low switches is activated and each of the plurality of high switches is deactivated, and in the second mode of operation, each of the plurality of high switches is deactivated and each of the plurality of low switches is deactivated.

17. The automotive propulsion system of claim 16, wherein the processing system is configured such that the alternating of the operation of the DC/AC power inverter between the first mode of operation and the second mode of operation occurs only if the back electromotive force, EMF, generated by the electric motor during the deceleration of the electric motor is above a first predetermined threshold.

18. The automotive propulsion system of claim 17, wherein the processing system is further configured to deactivate each of the plurality of high switches and each of the plurality of low switches if the back EMF generated by the electric motor during the deceleration of the electric motor is below the first predetermined threshold.

19. The automotive propulsion system of claim 18, further comprising a battery and wherein the processing system is further configured to alternate the DC/AC power inverter between a third mode of operation and a fourth mode of operation if the back EMF generated by the electric motor during the deceleration the electric motor is above a second predetermined threshold and the battery is electrically connected to the plurality of high switches and the plurality of low switches, wherein the second predetermined threshold is greater than the first predetermined threshold, and in the third mode of operation, each of the plurality of high switches is activated and each of the plurality of low switches is deactivated, and in the fourth mode of operation, each of the plurality of low switches is activated and each of the plurality of high switches is deactivated.

20. The automotive propulsion system of claim 19, wherein the DC/AC power inverter further comprises a plurality of diodes, each of the plurality of diodes being in an antiparallel configuration with a respective one of the high power switching devices and the low power switching devices of the plurality of pairs of power switching devices.

\* \* \* \* \*